(12) United States Patent
Skotschek

(10) Patent No.: US 10,899,587 B2
(45) Date of Patent: Jan. 26, 2021

(54) METHOD FOR CONTROLLING A LIFTING DEVICE

(71) Applicant: B&R INDUSTRIAL AUTOMATION GMBH, Eggelsberg (AT)

(72) Inventor: Ralf Skotschek, Steyr (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 173 days.

(21) Appl. No.: 16/145,328

(22) Filed: Sep. 28, 2018

(65) Prior Publication Data

US 2019/0100382 A1 Apr. 4, 2019

(30) Foreign Application Priority Data

Sep. 29, 2017 (EP) .................................... 17194041

(51) Int. Cl.
*B66C 13/48* (2006.01)
*B66C 13/04* (2006.01)
(Continued)

(52) U.S. Cl.
CPC ............ *B66C 13/48* (2013.01); *B65G 1/0464* (2013.01); *B65G 43/00* (2013.01); *B66C 13/04* (2013.01); *B66C 19/002* (2013.01)

(58) Field of Classification Search
CPC ..................................................... B66C 13/48
See application file for complete search history.

(56) References Cited

U.S. PATENT DOCUMENTS 4,547,857 A * 10/1985 Alexander ............. B66D 1/525
212/308
5,967,347 A * 10/1999 Miyata .................. B66C 13/063
212/275
(Continued)

FOREIGN PATENT DOCUMENTS

EP 2 402 280 1/2012

OTHER PUBLICATIONS

Europe Search Report conducted in counterpart Europe Appln. No. 17 19 4041 (dated Apr. 5, 2018).

(Continued)

*Primary Examiner* — Thomas Randazzo
(74) *Attorney, Agent, or Firm* — Greenblum & Bernstein, P.L.C.

(57) ABSTRACT

Method for controlling a lifting device to move a load along a trajectory, to move the load in an efficient, automated, and collision-free manner between points, includes a start point and end point of the trajectory and prohibited zones are established which, during motion of the load are avoided. A computing unit calculates a geometric or rounded geometric or smooth geometric path, that kinematic and geometric limit values of the lifting device are predetermined, from which the computing unit, on the basis of the geometric or rounded geometric or smooth geometric path, calculates a dynamic or rounded dynamic or smooth dynamic path which provides time information about motion of the load along the geometric or rounded geometric or smooth geometric path. The geometric or rounded geometric or smooth geometric path and the dynamic or rounded dynamic or smooth dynamic path are combined for producing the trajectory.

24 Claims, 4 Drawing Sheets

(51) Int. Cl.
  *B66C 13/06* (2006.01)
  *B66C 19/00* (2006.01)
  *B65G 1/04* (2006.01)
  *B65G 43/00* (2006.01)

(56) References Cited

U.S. PATENT DOCUMENTS

| | | | | |
|---|---|---|---|---|
| 6,065,619 A | * | 5/2000 | Miyata | B66C 13/48 |
| | | | | 212/270 |
| 2003/0193522 A1 | * | 10/2003 | Chandhoke | G05B 19/416 |
| | | | | 715/764 |
| 2007/0289931 A1 | * | 12/2007 | Henriksson | B66C 13/085 |
| | | | | 212/274 |
| 2009/0008351 A1 | * | 1/2009 | Schneider | B66C 13/46 |
| | | | | 212/272 |
| 2011/0006025 A1 | * | 1/2011 | Schneider | B66C 13/063 |
| | | | | 212/273 |
| 2011/0066394 A1 | * | 3/2011 | Schneider | B66C 13/16 |
| | | | | 702/101 |
| 2011/0076130 A1 | * | 3/2011 | Stocker | B66C 19/002 |
| | | | | 414/815 |
| 2012/0092643 A1 | * | 4/2012 | Rintanen | B66C 13/46 |
| | | | | 356/4.01 |
| 2012/0296519 A1 | * | 11/2012 | Eberharter | B63B 27/10 |
| | | | | 701/34.4 |
| 2013/0120577 A1 | * | 5/2013 | Austefjord | B66C 13/02 |
| | | | | 348/148 |
| 2013/0245817 A1 | * | 9/2013 | Schneider | B66C 13/085 |
| | | | | 700/228 |
| 2013/0345857 A1 | * | 12/2013 | Lee | B66C 13/48 |
| | | | | 700/229 |
| 2015/0112638 A1 | * | 4/2015 | Morrow | G01S 17/74 |
| | | | | 702/182 |
| 2016/0185574 A1 | * | 6/2016 | Enomoto | B66C 15/045 |
| | | | | 703/2 |
| 2017/0344009 A1 | * | 11/2017 | Wernersbach | G05D 1/0297 |
| 2018/0050889 A1 | * | 2/2018 | Fakkeldij | B66C 19/007 |
| 2018/0141789 A1 | * | 5/2018 | Rudy | G06T 7/70 |
| 2019/0112165 A1 | * | 4/2019 | Palberg | B66C 13/063 |

OTHER PUBLICATIONS

Huang et al., "The optimum route problem by genetic algorithm for loading/unloading of yard crane," Computers & Industrial Engineering, Pergamon, Bd. 56, Nr. 3, pp. 993-1001, XP025962128, ISSN: 0630-8352.

* cited by examiner

METHOD FOR CONTROLLING A LIFTING DEVICE

CROSS-REFERENCE TO RELATED APPLICATIONS

The present application claims priority under 35 U.S.C. § 119(a) of Europe Patent Application No. 17194041.4 filed Sep. 29, 2017, the disclosure of which is expressly incorporated by reference herein in its entirety.

BACKGROUND OF THE INVENTION

1. Field of the Invention

The invention relates to a method for controlling a lifting device for moving a load along a trajectory from a start point to an end point, wherein the load is moved along a first motion axis and along a second motion axis, the start point and the end point of the trajectory as well as prohibited zones being established which during motion of the load must be avoided by the load, and that from this a computing unit calculates a geometrical or rounded geometrical or smooth geometrical path. The invention further relates to a lifting device for moving a load along a trajectory.

2. Discussion of Background Information

Lifting devices, in particular cranes, exist in many different embodiments and are used in many different areas of application. For example, there are tower cranes that are used largely for above- and below-ground engineering, or there are mobile cranes which are used e.g. for the installation of wind power plants. Bridge cranes are used for example as overhead cranes in factory buildings and portal cranes, for example, for the manipulation of transport containers at transshipment points for intermodal freight transshipment, for example for transshipment from vessels to trains or trucks or two freight stations for transshipment from train to trucks or vice versa. Primarily in this case the freight is stored for transport in standardized containers, so-called ISO-containers, which are equally suited for transport in the three transport modes of road, rail, and water. The design and the function of a portal crane is adequately known and is described for example in US 2007/0289931 A1 with reference to a "ship-to-shore" crane. The crane has a bearing structure or portal on which an outrigger is arranged. The portal is arranged in a movable manner with wheels for example on a track and can be moved in one direction. The outrigger is securely fastened to the portal and a moving trolley is then arranged on the outrigger and can move along the outrigger. For receiving freight, for example an ISO-container, the trolley is generally connected by four cables to a load receiver element, a so-called spreader. For receiving and manipulating a container, the spreader can be raised or lowered by cable winches, here via two cable winches for two cables in each case. The spreader can also be adapted to different-size containers.

In order to raise the economy of logistical processes, among other things a very quick freight transshipment is necessary, that is, for example very quick loading and unloading of traders and accordingly rapid motion processes of the load receiver elements and the portal cranes as a whole, Such rapid motion processes however can result in undesired swinging, in particular swinging motions of the load receiver element, which again delay the manipulation process as the containers cannot be precisely placed at the site provided.

Usually such cranes are operated nowadays by a crane operator who controls the motion of the crane from a cab which is arranged for example on the portal or the moving trolley. For rapid, precise, and collision-free manipulation of freight, high demands are put on the crane operator, so that as a rule about one-year of training and education is required. In particular, rapid motion of the load with the least possible swinging motion is a very complex activity so that as a rule longer practical experience is needed in order to allow trouble-free operation. Another difficulty in the work of a crane operator is the high physical stress owing to the high concentration with prolonged sitting, for example with downward gaze and the mental stress due to ever-increasing demands on throughput time. To provide continuous 24-hour operation, in addition several preferably experienced crane operators are needed. It is therefore a clear object of the automation engineering to at least partially automate the complex manipulation processes of a crane and to do justice to the growing demands for shorter throughput times as well as reduced error frequency (for example collisions), as well as to make the work of a crane operator easier.

U.S. Pat. No. 6,065,619 A describes a method for producing a trajectory of the bridge crane for moving a load between two points while avoiding collisions with obstacles, and in particular with stacked containers. Initially any speeds are established for the vertical lifting motion and the horizontal motion of the trolley and the positions and the heights of the obstacles are obtained via sensors. Furthermore, a user-defined waiting time for the start of the horizontal motion and waiting time for the start of the vertical lowering of the load is established. Based on the predetermined values, by a simulation it is determined whether a collision-free motion is possible and if not, the values are iteratively changed until a collision-free trajectory is achieved. A simulation and subsequent iteration is relatively time-consuming and does not achieve time optimized control.

SUMMARY OF THE EMBODIMENT

Embodiments of the invention provide a method for controlling a lifting device that makes it possible to move the load between two points efficiently and in an automated and collision-free manner.

According to embodiments, kinematic and geometric limits of the lifting device are predetermined, from which the computing unit, based on the geometric or rounded geometric or smooth geometric path, calculates a dynamic or rounded dynamic or smooth dynamic path which provides the time information for moving the load along the geometric or rounded geometric or smooth geometric path, and the geometric or rounded geometric or smooth geometric path and the dynamic or rounded dynamic or smooth dynamic path are combined for producing the trajectory. Furthermore, embodiments are directed to a lifting device with at least two motion axes for moving a load along a trajectory. By this method it is possible that no manual contribution for example from a crane operator is needed any longer for moving on load along a trajectory. In addition, the load may be moved along the produced trajectory rapidly and in a reproducible manner, which results in a time saving. The method can in addition be used for any translational lifting device of any size, and based on the standardized trajectory or trajectories with known duration, the method can also be integrated in a container management program for example, so that loading and unloading processes can be planned precisely in terms of time and can therefore be optimized. It is also especially advantageous that during the manipulation process the trajectory can be re-planned such that for example the predetermined end point can be altered or swing-free stopping of the load on the produced trajectory is possible. Here it is quite especially advantageous if the smooth paths are used to produce the trajectory in each case because this can reliably minimize swinging motions of the load during motion of the load along the trajectory.

It is advantageous if the start point and the end point of the trajectory are established in a first plane spanning the first axis and the second axis, wherein the prohibited zones are established in the first plane, the geometric or rounded geometric or smooth geometric path are being calculated in the first plane, wherein based on the geometric or rounded geometric or smooth geometric path, the dynamic or rounded dynamic or smooth dynamic path is calculated, the geometric or rounded geometric or smooth geometric path and the dynamical rounded dynamic or smooth dynamic path being combined to produce the trajectory in the first plane. In this way it is possible to produce an optimal trajectory for a travelling crane, for example, which has a vertical axis and a longitudinal axis.

In an especially advantageous embodiment of the method, the load is additionally moved along a third motion axis of the lifting device, wherein the start point and the end point of the trajectory are established in any second plane in a motion space spanning the three motion axes of the lifting device, the prohibited zones being established in the second plane, wherein the geometric or rounded geometric or smooth geometric path is calculated in the second plane, and wherein based on the geometric or rounded geometric or smooth geometric path, the dynamic or around the dynamic or smooth dynamic path is calculated and the geometric around the geometric or smooth geometric path and the dynamic or rounded dynamic or smooth dynamic path are combined to produce the trajectory in the second plane. In this way it is possible to produce any two-dimensional trajectory in space. For example, for a three-axis dockside crane and optimal two-dimensional trajectory in an arbitrary plane for an arbitrarily selectable start and end point in the motion space can be generated.

According to a further advantageous embodiment of the method, the load is moved along a third motion axis of the lifting device, wherein the start point and the end point of the trajectory are established in a motion space spanning the three motion axes of the lifting device, wherein the prohibited zones are established in the motion space, wherein the geometric or rounded geometric or smooth geometric path is calculated in the motion space, wherein based on the geometric or rounded geometric or smooth geometric path, the dynamic or rounded dynamic or smooth dynamic path is calculated, and wherein the geometric around the geometric or smooth geometric path and the dynamic or rounded dynamic or smooth dynamic path are combined in the motion space to produce the trajectory. In this way it is possible to produce an optimal three-dimensional trajectory in the space so that obstacles can be bypassed in a time-optimal multidimensional manner.

Advantageously, a limited working region of the lifting device in the first plane, the second plane, or in the motion space is established and the computing unit tests whether the start point, the end point, and the prohibited zones lie within the working region and whether a trajectory can be produced between the start point and the end point. By this plausibilization of trajectory generation, safety can be increased, since even before the load movement, a test is made as to whether the trajectory is plausible on the basis of the predetermined constraints.

Preferably as kinematic limit values of the lifting device, a maximal speed and a maximal acceleration of the bearing structure, a maximal speed and maximal acceleration of the travelling element as well as a maximal speed maximal acceleration of the lift drive are determined and as a geometric limit value, a maximal angle of deflection of the load receiver element is determined. By establishing these limit values, the constraints for calculation of the dynamic path are created, by which the type and the implementation of the lifting device can be taken into account.

Preferably, so as to produce the geometric path, the start point is connected to the end point via straight lines via supporting points, wherein the supporting points are derived from the prohibited zones. Thus without much computational effort a simple geometric path can be produced as the basis for the entire trajectory.

It is advantageous when, for producing the rounded geometric path, the geometric path is rounded at the supporting points. The method can be standardized by these known geometric forms or rounding methods.

Preferably the rounded geometric path for producing the smooth geometric path is rounded by B-splines. Through the production of the smooth geometric path, a snap-free and jerk-free motion of the load along the trajectory can be ensured.

Advantageously, so as to produce the rounded dynamic path, the dynamic path is rounded by a forward-backward filtering method. For producing the smooth dynamic path, preferably the rounded dynamic path is smoothed by B-splines. In this way the time motion process of the load along the trajectory is substantially established such that no undesired swinging motions occur during the motion.

BRIEF DESCRIPTION OF THE DRAWINGS

The embodiments are described in more detail below with reference to FIGS. 1-4, which for example, show schematic, non-limiting advantageous embodiments, wherein.

DETAILED DESCRIPTION OF THE EMBODIMENTS

Figure 1:
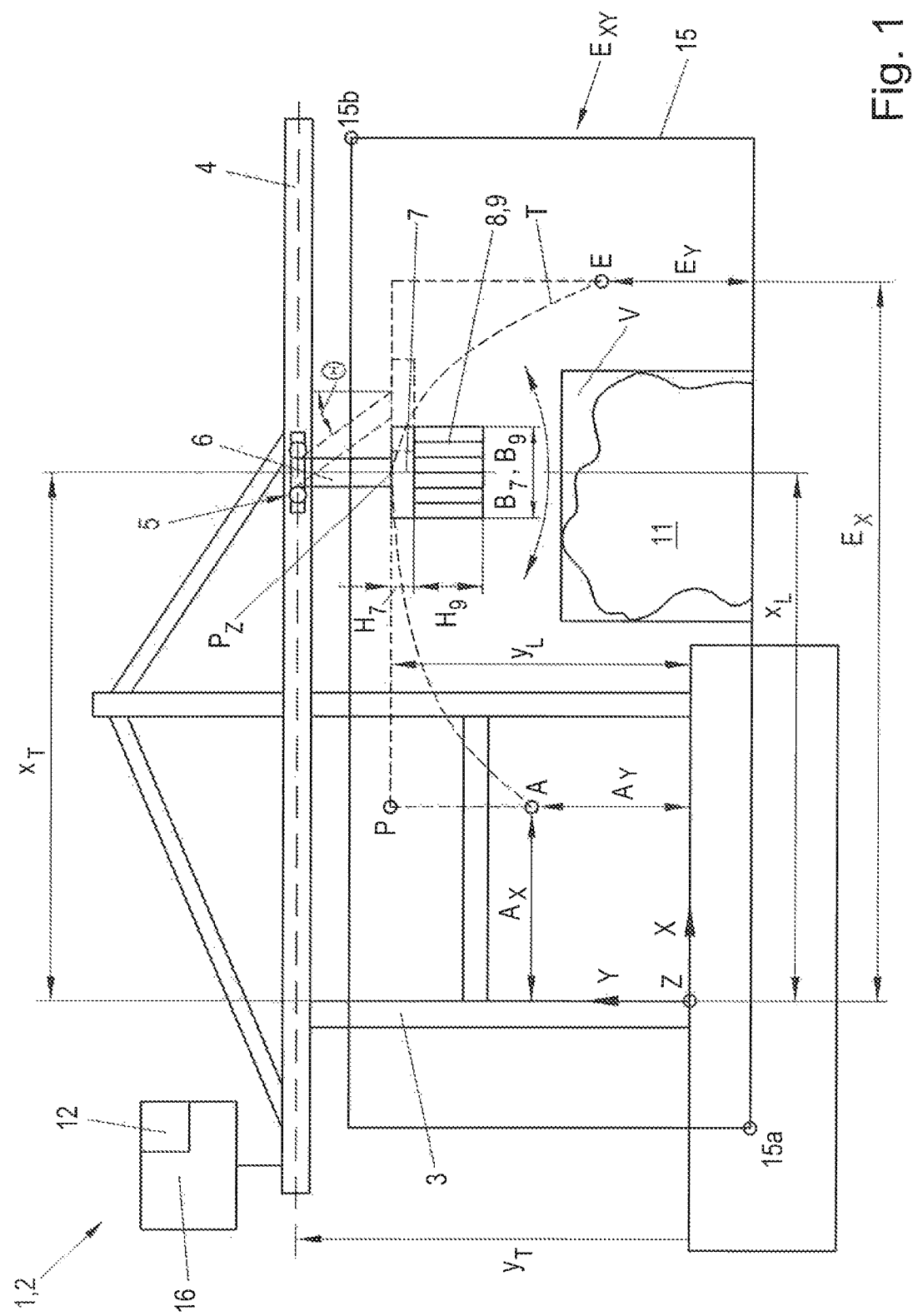
FIG. 1 is a schematic representation of a container crane with a trajectory within a working region of the container crane.

FIG. 1 shows a lifting device 1 for example with reference to a schematic container crane 2, which is used for example for loading and unloading of vessels in a harbor. Usually a container crane 2 has a bearing structure 3 which is either fixed or movably arranged on the ground. In the case of a moving arrangement the bearing structure 3 for example can be arranged drivably in the Z-direction on rails. By this degree of freedom in the Z-direction, the container crane 2 may be used locally flexibly. For moving the bearing structure 3 and the Z-direction, for example a suitable displacement device can be arranged on the lifting device, for example driven wheels, a cable poll, a rack and pinion gear or the like. The bearing structure 3 has an outrigger 4 which at a specific height $y_T$ is securely connected to the bearing structure 3. Usually a travelling element 5 is arranged on this outrigger 4, which is movable in the longitudinal direction of the outrigger 4, thus in the example shown in the X-direction, for example a travelling element 5 can be supported by rollers in guides. For the travelling element 5, a travelling element drive (not shown) is provided in order to move the travelling element 5 in the X-direction. The travelling element drive can be provided on the travelling element 5 itself, but can also be arranged on the outrigger 4 or on the bearing structure 3. The travelling element 5 is usually connected by retaining elements 6 to a load receiver element 7 for receiving a load 8. In the case of a container crane 2, the load 8 is usually a container 9, in most cases and ISO-container with the length of 20, 40, or 45 feet, a width of 8 feet, and a height of 8 feet 6 inches. There are also load receiver elements 7, however, which are suited for receiving two containers 9 next to each other at the same time (so-called dual spreaders). The retaining elements 6 are usually designed as cables, wherein in most cases four retaining elements 6 are arranged on the travelling element 5, but there can also be more or fewer retaining elements 6 provided; in the simplest case even just one retaining element 6. For receiving a load 8, such as a container 9, the distance between the travelling element 5 and the load receiver element 7 may be adjusted by a lift drive (not shown), in FIG. 1 in the Y-direction. When the retaining elements 6 are designed as cables, the lifting height usually is adjusted by one or more cable winches.

For manipulating loads 8, for example containers 9, the lifting device 1, for example the container crane 2 can thus be moved in the direction of at least two axes (X, Y), preferably three axes (X, Y, Z). As a rule, the lifting device 1 also has a crane control 16, for example in the form of an electronic control unit in the form of suitable hardware and software over which the motion of the load 8 can be controlled in the respective axes X, Y, Z. The crane control 16 for this purpose communicates with the corresponding drives. The crane control 16 usually is designed such that the current position of the travelling element 5 and the load receiver element 7, and possibly also the bearing structure 3 can be registered. Thus, in figure for example the coordinates of a central point $P_Z$ arranged on the load receiver element 7 top side facing the outrigger 4 in the shown X-Y plane $E_{XY}$ with the position $x_L$ and position $y_L$ of the load receiver element 7 in the X-direction and Y-direction and with the position $x_T$ and $y_T$ of the travelling element 5 in the X-direction and Y-direction (wherein the position $y_T$ of the travelling element in the Y-direction often is defined by the structural height of the bearing structure 3 or of the outrigger 4 and is constant). The positions relate to a given coordinate system, With motion of the load 8 in the Z-direction, thus for a motion of the bearing structure 3 of the lifting device 1 in the Z-direction, the position $z_L$ of the load receiver element 7 or the position of the travelling element 5 in the Z-direction is registered.

Based on the rapid motion processes of the container 9 or wind effects, it may happen that the load receiver element 7 arranged on the retaining elements 6 along with the container 9 arranged thereon may start swinging, especially swinging motions here in the X-Y plane $E_{XY}$, as for example is shown by the double arrow in FIG. 1. A motion of the crane in the Z-direction can accordingly lead to a swinging motion in the Z-Y plane. With simultaneous motion of the load 8 in the Z-direction and X-direction, thus with motion of the bearing structure 3 and the travelling element 5, combined swinging motions in a vertical plane deviating from the X-Y plane or the Z-Y plane are also possible. An experienced crane operator as a rule will try to avoid the swinging motions or to keep them as small as possible in order to be able to perform rapid and precise manipulation of the load 8 from the start point A to a specific end point Z along the so-called trajectory T.

When a ship is being loaded, the start point A can be for example a position of a specific container 9 on land, such as a truck trailer, a railroad car, or a storage place, and the end position E can be for example a specific predetermined position of the container 9 on the ship. During unloading of the ship, naturally the start point A is on the ship and the end point E is on land. In order to keep the time for executing the manipulation as short as possible, as a rule the crane operator will try to select the shortest way possible between the start point A and the end point E, in the ideal case therefore the trajectory T is a straight line.

As is shown in FIG. 1, it may also happen that there is an obstacle 11 between the start point A and the end point E. The obstacle 11 could be another ship, for example, or stacked containers 9, or some other obstacle 11. The result of the obstacle 11 naturally is that no direct connection is possible between the start point A and the end point E, and thus no trajectory T in the form of a straight line is possible, as may be seen in FIG. 1. The actual trajectory T naturally strongly depends on the crane operator who is operating the crane and could look for example as in FIG. 1, that is, substantially a curved course between the start point A and the end point E, as is shown by the broken line. In the simplest case however, the trajectory T may also be a sequence of straight sections, as is shown by the dotdashed line in FIG. 1. Here the load is first raised only vertically in the Y-direction, then only horizontally in the X-direction, and finally to achieve the end point E again only vertically lowered. This motion process is disadvantageous, however, because a longer distance has to be traveled in comparison with a curved trajectory T, which results in a longer duration of the manipulation process. In addition, the load receiver element 7 with the container 9 arranged thereon, due to the abrupt change in direction at point P for example, from a purely vertical motion to a purely horizontal motion, is more apt to experience a swinging motion, which as a rule has to be balanced out by the crane operator, which is an additional time expenditure. For controlling the lifting device 1, therefore, the object is to create the shortest and smoothest trajectory T possible between the start point A and the end point E, which makes possible an automated and collision-free motion process with the smallest possible swinging motion. For example, the method according to the invention is shown with reference to a first trajectory T in the X-Y plane $E_{XY}$ of the lifting device 1 in FIG. 2.

According to the invention, it is provided that the start point A and the end point E of the trajectory T as well as the prohibited zones $V_i$ are determined which during motion of the load 8 are avoided by the load 8, that a computing unit 12 calculates a geometric path G or a rounded geometric path G', or a smooth geometric path G" as follows, that kinematic and geometric limits values of the lifting device 1 are determined from which the computing unit 12, based on the geometric or rounded geometric or smooth geometric path G, G', G" calculates a dynamic path D or rounded dynamic path D' or smooth dynamic path D", as described below which provides the time information of the motion of the load 8 along the geometric or rounded geometric or smooth geometric path G, G', G", and that the geometric or rounded geometric or smooth geometric path G, G', G" and the dynamic or rounded dynamic or smooth dynamic path D, D', D" are combined to produce the trajectory T. The computing unit 12 can for example be suitable hardware with suitable software or can be integrated in the crane control 16 as software.

Figure 2:
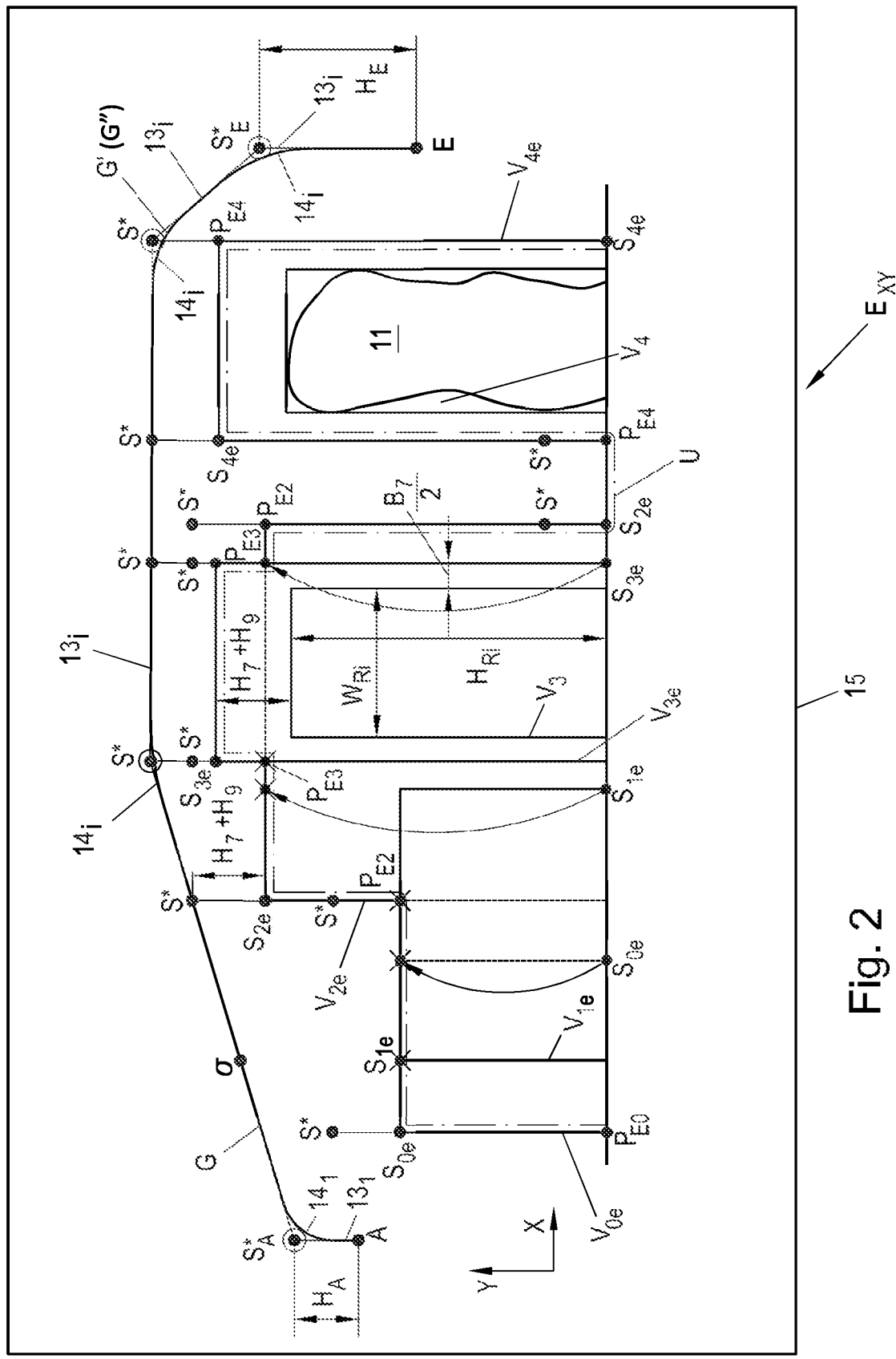
FIG. 2 is a geometric path of a trajectory within a working region with prohibited zones.

In FIG. 2, for simpler representation only the trajectory T with the start point A, end point E, and the prohibited zones $V_i$ are shown (the index i here relates to the number of prohibited zones $V_i$). The coordinates $A_X$, $A_Y$ of the start point A and the coordinates $E_X$, $E_Y$ of the end point F are established in the plane $E_{XY}$. For example, the start point A can be predetermined by the container 9 which has to be moved and the end point E by a position to which the container 9 is to be offloaded. A prohibited zone $V_i$ represents an obstacle 11 or a region which should not or may not be touched by the load 8 during motion of the load 8 along the trajectory T, for example in order to avoid a collision or to ensure an adequate safety distance from persons.

Depending on the area of application of the lifting device 1, various obstacles 11 can be arranged between the start point A and the end point E. The number, type, and configuration of the obstacles 11 play no role for the invention; it could for example be only one obstacle 11, several obstacles 11 of different size, or no obstacles 11 at all. It is only important that, with reference to the obstacles 11 and/or other prohibited regions, the prohibited zones $V_i$ can be defined which are avoided by the load 8 during the motion of the load 8 along the trajectory T. The prohibited zones $V_i$ can also over overlap. For example, in FIG. 2 two of the five prohibited zones $V_0$-$V_4$ are shown ($V_3$, $V_4$).

The prohibited zones $V_i$ as well as the start and end points A, E can either be defined manually by a user, for example over a suitable interface in the computing unit 12, or automatically obtained by the computing unit 12. For that purpose, for example a suitable laser scan procedure can be used, which probes a working region 15 of the lifting device 1 and in the process identifies and measures obstacles 11 and relays the data obtained to the computing unit 12. Such procedures are known from the prior art.

For defining the prohibited zones $V_i$ a hull of the obstacle 11 in the form of a rectangle can be used, which fully encloses the obstacle 11, as shown in FIGS. 1 and 2. Here the height $H_{Ri}$ of the rectangle corresponds to the maximal extent of the obstacle 11 in the Y-direction and the width $W_{Ri}$ of the rectangle the maximal extent of the obstacle 11 in the X-direction (the index i here again relates to the number of prohibited zones $V_i$). This is of course only to be understood as an example; other geometric specifications of the prohibited zones $V_i$ are also conceivable. For example, this can range all the way from a single prohibited zone V, which encloses several obstacles 11, to a finger definition of several prohibited zones $V_i$, for example using the specific outline of an obstacle 11. Here the effort for detailing the prohibited zones $V_i$ should be as small as possible and as precise as necessary in order to allow an efficient method for producing the trajectory T.

On the basis of the prohibited zones $V_i$, the computing unit 12 calculates a number of supporting points $S_{ie}$. In calculating the supporting points $S_{ie}$, the size of the load 8 can be taken into account, using the example of a container crane 2 therefore the dimensions of the standard ISO-container in order to ensure in any case a minimal separation from the prohibited zones $V_i$ or obstacles 11. When the coordinates of the load receiver element 7 as described relate to the central point $P_Z$ of the load receiver element 7, the measurements of the load receiver element 7 must also be taken into account. For example, for an empty run without container 9 it may suffice to only take the dimensions of the load receiver element 7 into account when calculating the supporting points $S_{ie}$, so that the load receiver element 7 can be moved along a trajectory T which is closer to the prohibited zones $V_i$ than a trajectory T with container 9, so that the path and thus the time of the manipulation can be reduced.

In order to ensure a minimal separation of the load 8, for example container 9 from the prohibited zones $V_i$, that is to avoid a collision of the load 8 with an obstacle 11 in any case, in the example shown in the plane $E_{XY}$, for example the height $H_7$ of the load receiver element 7 and the height $H_9$ of the container in the Y-direction are added to the height $H_{Ri}$ of the rectangular prohibited zone $V_i$ and on both sides (in the X-direction) of the prohibited zones $V_i$ the half width $B_7$ of the load receiver element 7 (which usually corresponds to the half width $B_9$ of the container 9) is added to the width $W_{Ri}$ of the prohibited zone $V_i$ as shown in FIG. 2 with reference to the prohibited zone $V_3$. For different widths of the load receiver element 7 and the container 9 ($B_7 \neq B_9$) preferably the larger of the two widths is used. Depending on the desired safety distance, the size of a prohibited zone $V_i$ can also be made larger. By taking the dimensions of the container 9 and the load receiver element 7 into account, one obtains an expanded prohibited zone $V_{ie}$, in the specific example for example the expanded prohibited zone $V_{3e}$.

The upper left and lower right corners of the expanded prohibited zones $V_{ie}$ (thus the rectangles in the example shown) form the supporting points $S_{ie}$. The supporting points $S_{ie}$ are sorted and the supporting points $S_{ie}$ which are irrelevant for producing the geometric path G are discarded. For this purpose, for example, the lower supporting points $S_{ie}$ of an expanded prohibited zone $V_{ie}$ which are covered by an overlying and in the Y-direction higher lying expanded prohibited zone $V_{ie}$ are brought to the height of these higher lying expanded prohibited zones $V_{ie}$, as is shown in FIG. 2 by the arrow on the supporting points $S_{0e}$, $S_{1e}$, $S_{3e}$. Supporting points $S_{ie}$, which are accordingly redundant, are removed (in FIG. 2 symbolized by the cross in the corresponding supporting points). Supporting points $S_{ie}$ in this example are understood to be redundant if, looking in the Y-direction they lie at the same height and do not lie on a vertex of an expanded prohibited zone $V_{ie}$. The remaining supporting zones $S_{ie}$ and the remaining freely lying vertices $P_{Ei}$ on the outline U (in FIG. 2 shown as a dotdashed line) of the expanded prohibited zones $V_{ie}$, thus the vertices $P_{Ei}$ lying on the outline U of the expanded prohibited zones $V_{ie}$ which are not covered by an expanded prohibited zone $V_{ie}$—these are in the present example the vertices $P_{E2}$, $P_{E3}$, $P_{E4}$—are preferably still displaced upward by the height $H_9$ of the container and the height $H_7$ of the load receiver element 7 in the Y-direction in order to provide, in addition to the described minimal distance, another safety distance of the trajectory T from the prohibited zones $V_i$ and thus from the obstacles 11. One obtains the displaced supporting points S*. The lower vertex $P_{Ei}$ that is closest to the start point A, and the supporting point $S_{ie}$ the furthest right, thus lying closest to the end point E (in the present example the left lower vertex $P_{E0}$ of the expanded prohibited zone $V_{0e}$ and the right lower supporting point $S_{4e}$ of the expanded prohibited zone $V_{4e}$) are not displaced in the X-direction. This step is not urgently necessary, but it is advantageous, for example for avoiding collisions and possibly to protect persons standing on an obstacle 11. The safety distance could naturally also be made larger or smaller. The start point A and the end point F in the example shown are likewise displaced upward by a specific height $H_A$ or $H_E$ in the Y-direction; one obtains the supporting points $S_A^*$ and $S_E^*$, as may be seen in FIG. 2. The displacement of the start point A and the end point E substantially serves, at the start of the motion of the load 8, to allow execution of a purely vertical lifting motion of the load 8, and at the end of the motion of the load 8, to allow a purely vertical lowering of the load 8 to the end point E. On the basis of these displaced supporting points $S^*$, $S^*_A$, $S^*_B$ and the start point A and end point E, a hull, a so-called convex hull, is obtained. There are various known methods for finding the convex hull, for example the known Graham's scan procedure.

The supporting points $S^*$, $S^*_A$, $S^*_B$ after the Graham scan procedure (in FIG. 2 designated by the circle around the perspective point) together with the start point A and the end point E form the convex hull and are connected to one another by the straight lines $13_i$ by which a geometric path G is produced, as may be seen in FIG. 2. The geometric path G thus describes only the geometry but contains no dynamic information about the motion of the load 8 such as, for example, speeds, accelerations, etc.

In order to generate a trajectory T which the load 8 can follow with the smallest possible swinging motions, thus in order to allow a uniform motion process without abrupt direction changes, the geometric path G on the remaining supporting points $S^*$, $S^*_A$, $S^*_B$ (thus on the interfaces of the straight lines $13_i$) is preferably rounded. The rounding can be done for example by simple circular segments $14_i$ (as shown in FIG. 2), by Bezier curves, clothoids, or other known suitable methods. After rounding, the resulting rounded geometric path G' is sampled with so-called known B-splines (not shown in FIG. 2). In this way, a smoothness for producing the smooth geometric path G" is achieved, wherein the smooth geometric path G" in every direction of motion (in the example X- or Y-direction) has fourfold continuous geometric differentiability.

Finally one obtains the smooth geometric path G" with the path parameter σ and corresponding coordinates x(σ), y(σ) in the plane $E_{XY}$. The described step-by-step production of the smooth geometric path G" however is to be understood only as an example; other methods are also conceivable which allow producing a smooth geometric path G" (in the sense of a multiple, in particular fourfold, continuous geometric differentiability (in the X- and Y-direction)). In the example shown, for modeling of the lifting device 1, a pendulum equation of a simple pendulum is used, as will be described in more detail below. The requirement for a fourfold continuous geometric differentiability of the smooth geometric path G" is derived from the pendulum equation. In alternative modeling of the lifting device 1, however, a different requirement could arise for the smooth geometric path G", for example higher or lower-order continuous geometric differentiability than with the pendulum equation shown.

Figure 3:
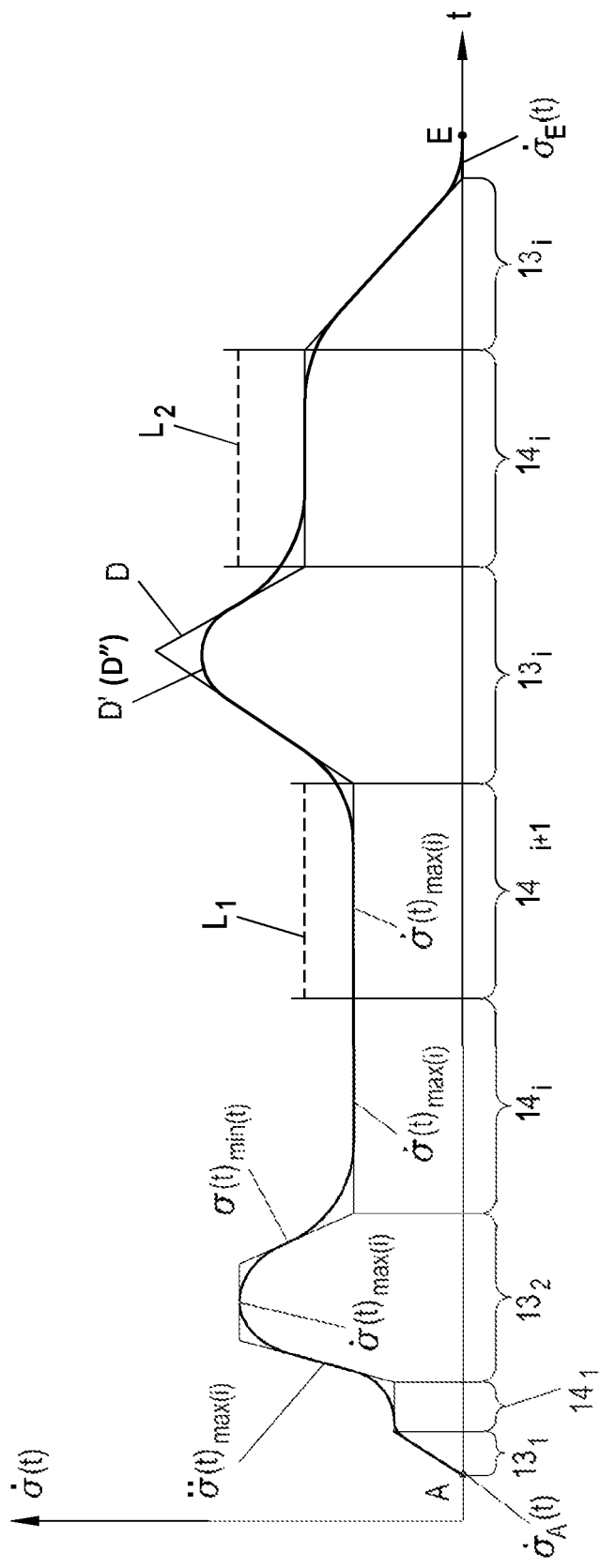
FIG. 3 is a dynamic path of the trajectory.

Finally, the computing unit 12 on the basis of the geometric path G (or the rounded geometric path G' or the smooth geometric path G") calculates a dynamic path D which makes time information of the trajectory T available so that one obtains a time-dependent path parameter σ(t) with the path speed $\dot{\sigma}(t)$ as the time derivative as shown in FIG. 3. Thus, the time information describes when and where the load 8 should be along the trajectory T. This is shown by the dynamic parameter of motion of the load 8, for example speed, acceleration, jerk, snap.

The calculation of the dynamic path D takes place on the basis of the predetermined kinematic and geometric limit values of the lifting device 1, which are set by the computing unit 12, and the geometric path G (or rounded geometric path G', or the smooth geometric path G"). These kinematic limit values are preferable a maximal speed $v_{Tmax}$ and a maximal acceleration $a_{Tmax}$ of the travelling element 5 in the plane $E_{XY}$ and a maximal speed $v_{Hmax}$ and a maximal acceleration $a_{Hmax}$ of the lift drive in the Y-direction. A geometric limit value is for example a maximal angle of deflection $\Theta_{XYmax}$ of the load receiver element 7 in the plane $E_{XY}$. For a third motion direction of the lifting device 1 in the Z-direction, in addition a maximal speed $v_{Smax}$ and a maximal acceleration $a_{Smax}$ of the hearing structure 3 as kinematic limit values and a maximal angle of deflection $\Theta_{ZYmax}$ of the load receiver element 7 in the plane $E_{ZY}$ as geometric limit value can be predetermined.

The limit values are used to obtain the corresponding dynamic limit values for the individual sections of the geometric path G. Here the rounded geometric path G' or the smooth geometric path G" can also be used. Thus, with this step, dynamic limit values are obtained from the kinematic and geometric limit values of the available motion parameters of the lifting device 1 for the path parameter a using the geometric path G (or the rounded geometric path G' or the smooth geometric path G"). Dynamic limit values may be understood as maximal motion variables (e.g. speed, acceleration) of the load 8 for motion along the trajectory T, which are predetermined by the structural design of the lifting device 1. This means that the load 8 can be moved only as quickly as permitted by the components of the lifting device 1 responsible for motion. For example, the maximal speed and the maximal acceleration of the load 8 in the Y-direction are substantially limited by the specific configuration of the lift drive, such as the power and torque of an electric motor of a cable winch of the lift drive.

To simplify the calculation, in the example shown the dynamic path D is used on the basis of the rounded geometric path G', because this rounded geometric path G' has defined geometric sections (straight lines $13_i$ and circular segments $14_i$). After B-spline sampling, one obtains a higher-order smooth geometric path G", which would complicate calculation of the dynamic path D. Preferably it is also assumed that an acceleration of the load 8 is possible only on straight lines $13_i$, but not on curve segments $14_i$. Naturally however, an acceleration or deceleration could also occur on the curved segments $14_i$ and the path planning could be carried out on the basis of the smooth geometric path G" after B-spline sampling, but both would increase the computational effort.

FIG. 3 shows a dynamic path D derived from the rounded geometric path G' from FIG. 2 as an example with reference to a diagram with the path speed $\dot{\sigma}(t)$ over the time t, wherein the dynamic limit values of the individual section are evident. The dynamic path planning takes place in the first step without jerking limitation, at most with the second time derivative of the path parameter σ(t), thus the path acceleration $\ddot{\sigma}(t)$, as is evident in FIG. 3. Therefore, only speeds and accelerations must be predetermined as limit values. On straight lines $13_i$, the motion of the load 8 for example is limited by a maximal path speed $\dot{\sigma}(t)_{max(i)}$ and a maximal and minimal path acceleration (or path deceleration) $\ddot{\sigma}(t)_{max(i)}$, $\ddot{\sigma}(t)_{min(t)}$. On circular segments $14_i$ the motion of the load 8 for example is limited only by a maximal path speed $\dot{\sigma}(t)_{max(i)}$; an acceleration or deceleration on circular segments $14_i$ is not envisioned in accordance with the assumption made in the example but would likewise be conceivable.

The rounded geometric path G' derived from the geometric path G in FIG. 2 starts at the start point A with a first vertical straight line $13_1$ and then transitions to a first circular segment $14_1$. According to the assumptions that were made, in the circular segment $14_1$ the path speed cannot be increased or reduced. The circular segment $14_1$ transitions to a second straight line $13_2$ etc. On the straight line $13_i$ a path acceleration is permissible. Therefore, the acceleration is at the maximal path acceleration $\ddot{\sigma}(t)_{max(i)}$ until the maximal permissible path speed $\dot{\sigma}(t)_{max(i)}$ is reached. In the following circular segment $14_i$, a maximal permissible bath speed $\dot{\sigma}(t)_{max(i)}$ is defined, which is lower than on a straight line $13_i$. Therefore, the maximal permissible path deceleration $\ddot{\sigma}(t)_{min(t)}$ is used so as to reach the maximally permissible path speed $\dot{\sigma}(t)_{max(i)}$ in the following circular segment $14_i$. In this way, from the total rounded geometric path G' with the predetermined limit values, a dynamic path D not limited by jerk is produced.

As is shown in FIG. 3 by the broken line $L_1$, with successive circular segments $14_i$ and $14_{i+1}$, motion on the circular segment $14_{i+1}$, e.g. can also take place at a higher speed if the dynamic limit values allow. In the described example, however, this is dispensed with and the circular segment $14_{i+1}$ is passed through with the same speed as the circular segment $14_i$. Analogously to this, for example, as is shown by the broken line $L_2$, in the shown example in the circular segment $14_i$, a higher speed is possible because the kinematic and geometric limit values of the lifting device 1 allow it. Of course, in this case the speed in the circular segment $14_i$ must be limited so as to fulfill the required condition of stoppage of the load 8 at the end point E, thus terminal speed $\dot{\sigma}(t)=0$ by the maximally possible deceleration on the next straight line $13_i$ predetermined by the kinematic and geometric limit values.

The extent of the dynamic limit values naturally can vary in size and is dependent on the respective straight line $13_i$ or the respective circular segment $14_i$ of the rounded geometric path G'. For example, the maximal path speed $\dot{\sigma}(t)_{max(i)}$ will increase on the circular segments $14_i$ with the radius of the circular segment $14_i$. For a straight line $14_i$, the maximal path speed $\dot{\sigma}(t)_{max(i)}$ depends for example on the ratio of the speed components in the X- and Y-direction. For a purely vertical motion of the load 8, for example primarily the kinematic limit values of the lift drive are decisive; for a purely horizontal motion of the load 8, the kinematic limit values of the travelling element 5 (or in the Z-direction of the displacement device of the bearing structure 3) are substantially decisive.

Preferably the dynamic path planning in the first step takes place without jerk limitation; in a next step there is rounding of the produced dynamic path D with a suitable known method, for example by filtering, for example by a forward/backward/filtering (zero phase filtering—FIR) or some other suited filtering procedure. In this way one obtains a rounded dynamic path D' as shown in FIG. 3, which is multiply (in the example shown threefold) continuously differentiable. Preferably the rounded dynamic path D' is finally sampled, analogously to the rounded geometric path G' by a B-spline for example, in order to be multiply (in the example shown fourfold) continuously differentiable with respect to time (the time derivatives of the path parameter $\sigma(t)$ are the path speed $\dot{\sigma}(t)$, the path acceleration $\ddot{\sigma}(t)$, the path jerk [|$]$`$$[|$]$` AD[|$]$`gj(t) and the path snap $\sigma^{(4)}(t)$, by which one obtains a smooth dynamic path D" (not shown in FIG. 3).

In the example of the rounded dynamic path D' shown in FIG. 3, it is plain that the load 8 in the start point A starts from a standstill, thus with an initial velocity $\dot{\sigma}_A(t)=0$. This is only by way of example and not urgently necessary; the load 8 could also be moved away with an initial speed $\dot{\sigma}(t)\neq 0$. An initial speed $\dot{\sigma}_A(t)\neq 0$ could advantageously be used for example to obtain the weight of the container 9 to be moved, which normally is not known. For example, a crane operator could first manually raise the container vertically from the standstill, wherein during the vertical motion the weight of the container 9 could be obtained by a suited measurement method. After obtaining the weight of the container 9, the automatic motion of the container 9 along the produced trajectory T could take place with the corresponding initial speed $\dot{\sigma}_A(t)\neq 0$, from which a time saving results, as the container 9 does not have to first be brought to a standstill and then started from the standstill. The weight of container 9 obtained can advantageously be used for dynamic path planning, e.g. when kinematic limit values of the lifting device 1, such as for example a maximal acceleration $a_{Tmax}$ of the travelling element 5, are dependent on the load 8 or the container 9.

Furthermore, it is plain in FIG. 3 that the dynamic path D at the end preferably has a time segment with a terminal speed $\dot{\sigma}(t)=0$. This segment is necessary so that, after rounding of the dynamic path D to the rounded dynamic path D', a standstill of the load 8 at the end point F can be ensured, thus fulfilling the condition of path speed $\dot{\sigma}(t)=0$ at the end point E. The precise embodiment depends here on the selected rounding method (zero-phase filtration—FIR etc.); it is important here that the load 8 at the end of the trajectory T can be brought to a standstill if this is envisioned.

When a terminal speed $\dot{\sigma}_E(t)\neq 0$ of the load 8 in the end point E is desired, e.g. because the crane operator is moving the load 8 manually vertically until standstill in the actual off-loading site, this can likewise be taken into account in the dynamic path planning. In this case, the load 8 could have, after rounding of the dynamic path D, a specific terminal speed $\dot{\sigma}_E(t)\neq 0$.

For producing the trajectory T, in the example shown, finally the smooth geometric path G" and the smooth dynamic path D" are combined, so that one obtains a relation according to the formula in the form $x(\sigma(t)); y(\sigma(t))$. For the position of the load 8 and its time derivatives, for example in the X-direction one obtains:

$$x_L = x_L(\sigma(t))$$

$$\dot{x}_L = \frac{\partial x_L}{\partial \sigma}\dot{\sigma}$$

$$\ddot{x}_L = \frac{\partial^2 x_L}{\partial \sigma^2}\dot{\sigma}^2 + \frac{\partial x_L}{\partial \sigma}\ddot{\sigma}$$

$$\dddot{x}_L = \frac{\partial^3 x_L}{\partial \sigma^3}\dot{\sigma}^3 + 3\frac{\partial^2 x_L}{\partial \sigma^2}\dot{\sigma}\ddot{\sigma} + \frac{\partial x_L}{\partial \sigma}\dddot{\sigma}$$

$$x_L^{(4)} = \frac{\partial^4 x_L}{\partial \sigma^4}\dot{\sigma}^4 + 6\frac{\partial^3 x_L}{\partial \sigma^3}\dot{\sigma}^2\ddot{\sigma} + 3\frac{\partial^2 x_L}{\partial \sigma^2}\ddot{\sigma}^2 + 4\frac{\partial^2 x_L}{\partial \sigma^2}\dot{\sigma}\dddot{\sigma} + \frac{\partial x_L}{\partial \sigma}\sigma^{(4)}$$

For the Y-direction one obtains for example based on the substantially rigid system of the lift drive (index H) the following simplified relation for the cable length $y_H$ and its time derivatives.

$$y_H = y_T - y_L$$

$$\dot{y}_H = -\dot{y}_L = -\frac{dy_L}{dt}$$

$$\ddot{y}_H = -\ddot{y}_L = -\frac{d^2 y_L}{dt^2}$$

$$\dddot{y}_H = -\dddot{y}_L = -\frac{d^3 y_L}{dt^3}$$

For a different embodiment of the lift drive, naturally a different relation could result.

So as to emerge from the motion of the load 8 to the motion of the travelling element 5, which is required for controlling the lifting device 1, a model of the lifting device 1 can be used, for example in the form of a pendulum equation for the load 8 as a simple pendulum according to $$x_T = x_L + \frac{\ddot{x}_L(y_T - y_L)}{\ddot{y}_L + g},$$

with the position $x_T$ of the travelling element 5 in the X-direction. Its time derivatives yield the speed $v_T$ of the travelling element 5 and acceleration $a_T$ of the travelling element 5.

$$v_T = \dot{x}_L + \frac{-\dot{y}_L\ddot{x}_L + (y_T - y_L)\dddot{x}_L}{\ddot{y}_L + g} - \frac{(y_T - y_L)\ddot{x}_L\dddot{y}_L}{(\ddot{y}_L + g)^2}$$

$$a_T = \ddot{x}_L + \frac{\ddot{y}_L\ddot{x}_L + 2\dot{y}_L\dddot{x}_L + (y_T - y_L)x_L^{(4)}}{\ddot{y}_L + g} -$$

$$\frac{2\dot{y}_L\ddot{x}_L\dddot{y}_L + 2(y_T - y_L)\dddot{x}_L\dddot{y}_L + (y_T - y_L)\ddot{x}_L x_L^{(4)}}{(\ddot{y}_L + g)^2} + \frac{2(y_T - y_L)\ddot{x}_L\dddot{y}_L^2}{(\ddot{y}_L + g)^3}$$

In order to be able to control the travelling element 5, for example with the computing unit 12, which for example is integrated in the crane controls, in such a way that the load 8 can be moved along the produced trajectory T, finally the load position $x_L = x_L(\sigma(t))$ in the X-direction and its time derivatives $\dot{x}_L$, $\ddot{x}_L$, $\dddot{x}_L$, $x_L^{(4)}$, as well as the load position $y_L = y_L(\sigma(t))$ and its time derivatives $\dot{y}_L$, $\ddot{y}_L$, $\dddot{y}_L$ are inserted in the above pendulum equation and its time derivatives. For reasons of clarity, at this point a separate representation of the relation according to the formula is dispensed with. By the described planning of the trajectory T, thus by the precise geometric and dynamic description of the motion process of the load 8, the planned trajectory T is imparted to the load 8, by means of which swinging of the load 8 during the motion along the trajectory T can be avoided.

From the trajectory T, then in each predetermined time step the set values can be calculated for controlling the motion of the travelling element 5. For this purpose, the computing unit 12 can also obtain the actual values of the position of the travelling element 5 for control.

The method is naturally not limited to the shown X-Y plane $E_{XY}$. For a third motion direction of the lifting device 1, e.g. in the Z-direction, for example a trajectory T can be produced in the Z-Y plane $E_{ZY}$, analogously to the described embodiment. For this purpose, for calculating the dynamic path D in the plane $E_{ZY}$, the kinematic limit values of the lift drive in the Y-direction as well as of the bearing structure 3 in the Z-direction (instead of the travelling element 5 in the X-direction) are decisive. In the pendulum equation, the X-component of the traveling element 5 would accordingly be replaced by the Z-component of the bearing structure, and one obtains the position $$z_S = z_L + \frac{\ddot{z}_L(y_T - y_L)}{\ddot{y}_L + g}$$

and the respective time derivatives $v_S$, $a_S$ analogously to the above description, wherein the index S relates to the structure 3. The height $y_T$ of the travelling element 5 is predetermined by the structural design of the lifting device 1 and remains the same during the described motion in the X-Y plane $E_{XY}$. The position $z_T$ of the travelling element 5 in the Z-direction however as a rule based on the fixed arrangement of the outrigger 4, on which the travelling element 5 is movably arranged in the X-direction, on the bearing structure 3 is identical to the position $z_S$ of the bearing structure 3 in the Z-direction.

Figure 4:
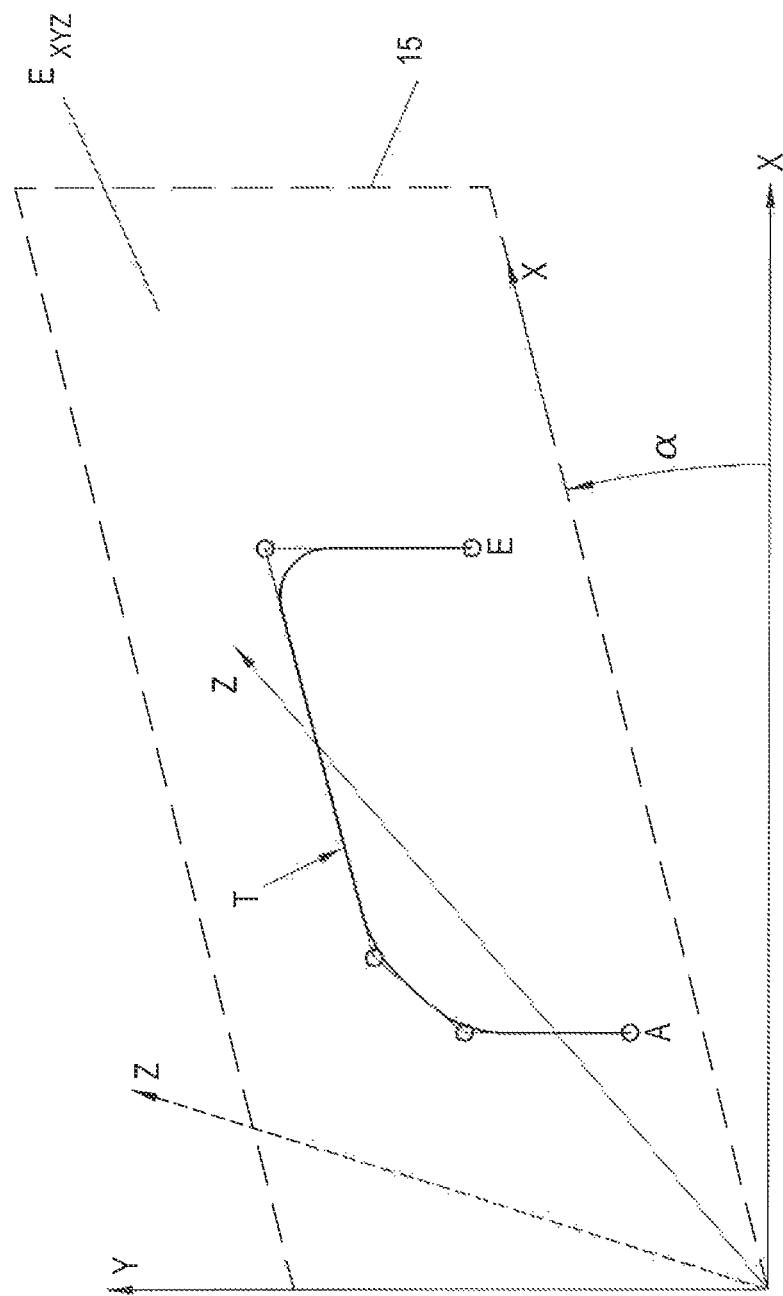
FIG. 4 is a trajectory in a plane within the space.

In the case of a three-axis lifting device 1 with lift drive (Y-axis), travelling element 5 (X-axis), and bearing structure 3 (Z-axis), however, the production of a trajectory T in any plane $E_{XY}$ in space would be possible, as shown in FIG. 4. FIG. 4, for example, shows a trajectory T on a plane $E_{XYZ}$ pivoted by an angle α about the Y-axis. Any other plane $E_{XYZ}$ in space would naturally also be possible. The basic process of the method remains unchanged, thus establishment of the start point A and end point E on the corresponding plane $E_{XYZ}$ in space, and establishment of prohibited zones $V_i$ in the plane $E_{XYZ}$. Production of the geometric path G (or rounded geometric path G' and smooth geometric path G") in the plane $E_{XYZ}$, calculation of the dynamic path D (or rounded and smooth dynamic path D', D"), and combination of one of the geometric paths G, G', G" with one of the dynamic paths D, D', D". The model equation in this case would be expanded by a Z-component, so that a mathematical description of the trajectory T in the corresponding plane $E_{XYZ}$ is possible. For calculating the dynamic path D in this case in addition to the kinematic limit values of the travelling element 5 and the lift drive, also the kinematic limit values of the bearing structure 3 would be necessary, thus for example a maximal speed $v_{Smax}$ and a maximal acceleration $a_{Smax}$ of the bearing structure 3.

Even if the invention for example was described only with reference to a trajectory T on the X-Y plane $E_{XY}$, an expansion from a two-dimensional trajectory T lying on a plane $E_{XYZ}$ in space to a three-dimensional trajectory T in space is possible. The basic method for producing the three-dimensional trajectory T in space remains unchanged.

In an advantageous embodiment of the method, a limited working region 15 of the lifting device 1 in the first plane, the second plane, or in the motion space is established, and the computing unit 12 tests whether the start point A, the end point E, and the prohibited zones $V_i$ lie within the working region 15 and whether a trajectory T can be produced between the start point A and end point E. A working region 15 for example is shown in FIGS. 1 and 2. Here the working region 15 in FIG. 1 is defined for example by the vertices 15a, 15b of a rectangle with corresponding coordinates $x_{min}$, $y_{min}$ or $x_{max}$, $y_{max}$ in the plane $E_{XY}$. By this plausibilization it is ensured that the predetermined start point A, end point E, and trajectory T also can in fact be implemented by the lifting device 1, thus are actually achievable by the load 8. Depending on the size and structural design of the lifting device, the working region 15 naturally can vary.

The establishment of the start point A, the end point F, and the prohibited zones $V_i$ and the specification to the computing unit 12 can be done manually via a suited interface, e.g. by a user such as the crane operator, but preferably automatically, for example via a laser scan method. Here preferably the working region 15 of the lifting device can be sampled via, for example, a laser scanner arranged on the travelling element 5, and for example obtains the positions and/or also the dimensions of the container 9, and relays them to the computing unit 12. Such laser scanners are known in the prior art, so that they are not examined more closely here.

What is claimed:

1. A method for controlling a lifting device for moving a load along a trajectory from a start point to an end point,
   moving the load along a first motion axis and along a second motion axis, wherein the start point and the end point of the trajectory and prohibited zones, which are avoided during motion of the load, are established,
   calculating a geometrical path or rounded geometrical path or smooth geometrical path, wherein kinematic and geometric limit values of the lifting device are predetermined,
   calculating, based on the geometric path or rounded geometric path or smooth geometric path, a dynamic path or rounded dynamic path or smooth dynamic path, which provides time information of motion of the load along the geometric path or rounded geometric path or smooth geometric path, and
   combining the geometric path or rounded geometric path or smooth geometric path and the dynamic path or rounded dynamic path or smooth dynamic path for producing the trajectory.

2. The method according to claim 1, wherein a maximal speed and a maximal acceleration of a bearing structure of the lifting device, a maximal speed and a maximal acceleration of a travelling element of the lifting device and a maximal speed and a maximal acceleration of a lift drive of the lifting device are established as the kinematic limit values of the lifting device, and a maximal angle of deflection of the load receiver element is established as the geometric limit value.

3. The method according to claim 1, wherein for producing the rounded dynamic path, the dynamic path is rounded by a forward-backward filtering method.

4. The method according to claim 1, wherein the load is moved along a third motion axis of the lifting device,
   wherein the start point and the end point of the trajectory are established in a motion space spanned by the first, second and third motion axes of the lifting device,
   wherein the prohibited zones are established in the motion space,
   wherein the geometric path is calculated in the motion space,
   wherein based on the geometric path, the dynamic path is calculated, and
   wherein the geometric path and the dynamic path for producing the trajectory in the motion space are combined.

5. The method according to claim 4, wherein motion space spanned by the first, second and third motion axes is a second plane in which the start point and the end point are established,
   wherein the prohibited zones are established in the second plane,
   wherein the geometric path is calculated in the second plane,
   wherein based on the geometric path, the dynamic path is calculated, and
   wherein the geometric path and the dynamic path for producing the trajectory in the motion space are combined in the second plane.

6. The method according to claim 1, wherein for producing the geometric path, the start point is connected to the end point by straight lines via supporting points, wherein the supporting points are derived from the prohibited zones.

7. The method according to claim 6, wherein for producing the rounded geometric path, the geometric path at the supporting points is rounded by circular segments or clothoids or Bezier curves.

8. The method according to claim 7, wherein for producing the smooth dynamic path, the rounded dynamic path and/or for producing the smooth geometric path, the rounded geometric path is smoothed by B-splines.

9. The method according to claim 1, wherein the start point and the end point of the trajectory are established in a first plane, which is spanned by the first motion axis and the second motion axis,
   wherein the prohibited zones are established in the first plane,
   wherein the geometric path is calculated in the first plane,
   wherein, based on the geometric path, the dynamic path is calculated, and
   wherein the geometric path and the dynamic path are combined for producing the trajectory in the first plane.

10. The method according to claim 9, wherein a working region of the lifting device in the first plane is established, and
    testing whether the start point, the end point, and the prohibited zones lie within the working region and whether a trajectory is producible between the start point and end point.

11. The method according to claim 9, wherein a working region of the lifting device in the second plane is established, and
    testing whether the start point, the end point, and the prohibited zones lie within the working region and whether a trajectory is producible between the start point and end point.

12. The method according to claim 9, wherein a working region of the lifting device in the motion space is established, and
    testing whether the start point, the end point, and the prohibited zones lie within the working region and whether a trajectory is producible between the start point and end point.

13. A lifting device having at least two motion axes for moving a load along a trajectory from a start point to an end point with a travelling element, comprising:
    a load receiver element, which is configured for receiving the load, is connected by at least one retaining element to the travelling element;
    a lift drive for lifting the load receiver element, wherein the travelling element is movable along a first motion axis and the load receiver element is movable by the lift drive along a second motion axis; and
    a computing unit is configured to calculate the trajectory between the start point and the end point and defined prohibited zones to be avoided by the load during motion of the load,
    wherein the computing unit is further configured to:
      calculate a geometric path or rounded geometric path or smooth geometric path between the start point and the end point,
      calculate, based on the geometric path or rounded geometric path or smooth geometric path with reference to predetermined kinematic and geometric limit values of the lifting device, a dynamic path or rounded dynamic path or smooth dynamic path, and combine the geometric path or rounded geometric path or smooth geometric path and the dynamic path or rounded dynamic path or smooth dynamic path into the trajectory.

14. The lifting device according to claim 13, wherein a maximal speed and a maximal acceleration of the bearing structure, a maximal speed and a maximal acceleration of the travelling element, a maximal speed and a maximal acceleration of the lift drive are established as the kinematic limit values of the lifting device, and a maximal angle of deflection of the load receiver element is established as the geometric limit value.

15. The lifting device according to claim 13, wherein the lifting device has a third motion axis, wherein the load is movable by a bearing structure along the third motion axis,
   wherein the start point and the end point are established in a motion space spanned by the first, second and third motion axes of the lifting device;
   wherein the prohibited zones are established in the motion space, and
   wherein the calculation of the trajectory is carried out in the motion space.

16. The lifting device according to claim 15, wherein motion space spanned by the first, second and third motion axes is a second plane in which the start point and end point are established;
   wherein the prohibited zones are established in the second plane, and
   wherein the calculation of the trajectory is carried out in the second plane.

17. The lifting device according to claim 13, wherein the computing unit is configured to produce the geometric path to connect the start point to the end point by straight lines via supporting points derived from the prohibited zones.

18. The lifting device according to claim 17, wherein the computing unit is configured to round the geometric path to produce the rounded geometric path at the supporting points by circular segments or clothoids or Bezier curves and/or to produce the rounded dynamic path, to round the dynamic path by a forward-backward filtering method.

19. The lifting device according to claim 18, wherein the computing unit is configurable to smooth:
   the rounded geometric path to produce the smooth geometric path and/or
   the rounded dynamic path to produce the smooth dynamic path by B-splines.

20. The lifting device according to claim 13, wherein the start point and end point are established in a first plane spanned by the first motion axis and the second motion axis, and
   wherein the prohibited zones are established in the first plane, wherein the calculation of the trajectory is carried out in the first plane.

21. The lifting device according to claim 20, wherein the lifting device has a working region in the first plane,
   wherein the limited working region is established in the computing unit for testing whether the start point, the end point, and the prohibited zones lie within the working region and whether a trajectory is producible between start point and end point.

22. The lifting device according to claim 20, wherein the lifting device has a working region in the second plane,
   wherein the limited working region is established in the computing unit for testing whether the start point, the end point, and the prohibited zones lie within the working region and whether a trajectory is producible between start point and end point.

23. The lifting device according to claim 20, wherein the lifting device has a working region in the motion space,
   wherein the limited working region is established in the computing unit for testing whether the start point, the end point, and the prohibited zones lie within the working region and whether a trajectory is producible between start point and end point.

24. A container crane having at least two motion axes for moving a load along a trajectory from a start point to an end point with a travelling element, comprising:
   a load receiver, which is configured for receiving the load, is connected by at least one retaining element to the travelling element; and
   a lift drive configured to lift the load receiver, wherein the travelling element is movable along a first motion axis and the load receiver element is movable by the lift drive along a second motion axis;
   wherein the trajectory between the start point and the end point and defined prohibited zones to be avoided by the load during motion of the load are calculated,
   wherein a geometric path or rounded geometric path or smooth geometric path between the start point and the end point is calculated,
   wherein, based on the geometric path or geometric path rounded or smooth geometric path with reference to predetermined kinematic and geometric limit values of the lifting device, a dynamic path or rounded dynamic path or smooth dynamic path is calculated, and
   wherein the geometric path or rounded geometric path or smooth geometric path and the dynamic or rounded dynamic or smooth dynamic path are combined into the trajectory.

* * * * *